United States Patent
Inoue et al.

(10) Patent No.: US 7,346,166 B2
(45) Date of Patent: Mar. 18, 2008

(54) QUANTUM KEY DISTRIBUTION SYSTEM AND METHOD USING REGULATED SINGLE-PHOTON SOURCE

(75) Inventors: Kyo Inoue, Atsugi (JP); Edo Waks, Stanford, CA (US); Yoshihisa Yamamoto, Stanford, CA (US)

(73) Assignees: The Board of Trustees of the Leland Stanford Junior University, Palo Alto, CA (US); Nippon Telegraph and Telephone Corporation, Chiyoda-ku, Tokyo (JP)

( * ) Notice: Subject to any disclaimer, the term of this patent is extended or adjusted under 35 U.S.C. 154(b) by 880 days.

(21) Appl. No.: 10/712,761

(22) Filed: Nov. 12, 2003

(65) Prior Publication Data

US 2005/0094818 A1   May 5, 2005

Related U.S. Application Data

(60) Provisional application No. 60/431,151, filed on Dec. 4, 2002.

(51) Int. Cl.
*H04L 9/00* (2006.01)
(52) U.S. Cl. .................................................. 380/263
(58) Field of Classification Search ................. 380/263
See application file for complete search history.

(56) References Cited

U.S. PATENT DOCUMENTS

| | | | |
|---|---|---|---|
| 5,307,410 A | 4/1994 | Bennett | 380/256 |
| 5,515,438 A | 5/1996 | Bennett et al. | 380/278 |
| 5,675,648 A * | 10/1997 | Townsend | 380/278 |
| 5,757,912 A * | 5/1998 | Blow | 380/256 |
| 6,438,234 B1 | 8/2002 | Gisin et al. | 380/256 |

OTHER PUBLICATIONS

Merriam-Webster Online, http://www.m-w.com/cgi-bin/dictionary?book=Dictionary&va=nanosecond, May 30, 2007.*
Artur K. Ekert, "Quantum cryptography based on Bell's theorem," Physical Review Letters, vol. 67, Aug. 5, 1991, No. 6.
Charles H. Bennett, "Quantum cryptography using any two nonorthogonal states," Physical Review Letters, vol. 68, May 25, 1992, No. 21.

(Continued)

*Primary Examiner*—Gilberto Barron, Jr.
*Assistant Examiner*—Jacob Lipman
(74) *Attorney, Agent, or Firm*—Lumen Patent Firm, Inc.

(57) ABSTRACT

A system and method for quantum key distribution uses a regulated single-photon source to sequentially generate a first photon and a second photon separated by a time interval $\Delta t$. The two photons are directed through a beam splitter that directs each photon to one of two transmission lines, which lead to two respective receivers. When one of the photons arrives at a receiver, it passes through an interferometer. One arm of the interferometer has a path length longer than the other arm by an amount equivalent to a photon time delay of $\Delta t$. The photon is then detected in one of three time slots by one of two single-photon detectors associated with each of the two interferometer outputs. Due to quantum-mechanical entanglement in phase and time between the two photons, the receivers can determine a secret quantum key bit value from their measurements of the time slots in which the photons arrived, or of the detectors where the photons arrived.

15 Claims, 5 Drawing Sheets

OTHER PUBLICATIONS

Thomas Jennewein et al., "Quantum cryptography with entangled photons," vol. 84, No. 20, Physical Review Letters, May 15, 2000.

Z. Y. Ou et al., "Violation of Bell's inequality and classical probability in a two-photon correlation experiment," vol. 61, No. 1, Physical Review Letters, Jul. 4, 1988.

Y. H. Shih et al., "New type of Einstein-Rosen-Bohm experiment using pairs of light quanta produced by optical parametric down conversion," vol. 61, No. 26, Physical Review Letters, Dec. 26, 1988.

Edo Waks et al., "Security of quantum key distribution with entangles photons against individual attacks," arXiv:quant-ph/0012078 vl, Dec. 16, 2000.

Rosa Brouri et al., "Photon antibunching in the fluorescence of individual color centers in diamond," Optics Letters/vol. 25, No. 17/Sep. 1, 2000.

G. Bonfrate et al., "Asymmetric Mach-Zehnder germano-silicate channel waveguide interferometers for quantum cryptography systems," Electronics Letters, Jun. 21, 2001, vol. 37, No. 13.

Yasuyuki Inoue et al., "Elimination of polarization sensitivity I silica-based wavelength division multiplexer using a polyimide half waveplate," Journal of Lightwave Technology, vol. 15, No. 10, Oct. 1997.

W. Tittel et al., "Quantum cryptography using entangled photons in energy-time Bell states," arXiv:quant-ph/9911109 vl, Nov. 25, 1999.

Nicolas Gisin et al., "Quantum cryptography," arXiv:quant-ph/0101098 v2, Sep. 18, 2001.

Charles H. Bennett et al., "Quantum cryptography without Bell's theorem," Physical Review Letters, vol. 68, No. 5, Feb. 3, 1992.

\* cited by examiner

QUANTUM KEY DISTRIBUTION SYSTEM AND METHOD USING REGULATED SINGLE-PHOTON SOURCE

CROSS-REFERENCE TO RELATED APPLICATIONS

This application claims priority from US provisional patent application 60/431,151 filed Dec. 4, 2002.

FIELD OF THE INVENTION

This invention relates generally to systems and methods for quantum cryptography. More specifically, it relates to improved systems and methods for entanglement-based quantum key distribution.

BACKGROUND OF THE INVENTION

Cryptography is concerned with the secure transmission of private information between two parties (referred to conventionally as Alice and Bob). When a classical communication channel is used, there is always the possibility that a third party (referred to as Eve) may eavesdrop on the channel. Thus, techniques must be used to secure the privacy of the transmitted information. For example, in classical cryptography Alice typically uses a cryptographic key to encrypt the information prior to transmission over the channel to Bob, so that it remains secure even if the channel is public. In order for Bob to decrypt the message, however, the cryptographic key must be communicated. Thus, to securely share private information, Alice and Bob already must have shared private information, namely the cryptographic key. A basic problem of cryptography, therefore, is how to initially establish a private key between Alice and Bob, and how to ensure that such a key distribution technique is secure against Eve.

Quantum key distribution (QKD) provides a solution to this basic problem of cryptography. Using techniques that take advantage of distinctively quantum-mechanical phenomena, it is possible to securely establish a private encryption key between Alice and Bob and guarantee that Eve has not eavesdropped on the communication. Quantum key distribution can provide this guarantee because quantum phenomena, in contrast with classical phenomena, cannot be passively observed or copied, even in principle. The very observation of quantum phenomena by Eve actively alters their characteristics, and this alteration can be detected by Alice and Bob.

Typically, QKD techniques use photons whose properties are measured by Alice and Bob. After each party measures a property of each photon, Alice and Bob then communicate limited information about their measurements using any conventional public communication channel. The limited information is not enough to allow Eve to obtain useful information, but it is enough to allow Alice and Bob to determine whether or not Eve attempted to observe the photons. If not, then the information allows Alice and Bob to sift the measurements and obtain a sifted key. From this sifted key they can then secretly determine a common cryptographic key, typically using error correction and privacy amplification techniques. Thus, this technique provides an inherently secure method for establishing a cryptographic key. Once the key is established using such a QKD technique, it can be used with conventional cryptographic techniques to provide secure private communication between Alice and Bob over a public communication channel.

Over the years, several different protocols for QKD have been proposed. In 1984 C. H. Bennett and G. Brassard proposed the first QKD protocol (BB84), published in *Proc. Of IEE Int. Conf. On Computers, Systems, and Signal Processing*, Bangalore, India (IEEE, New York, 1984), p. 175. The BB84 protocol involves the transmission of a photon from Alice to Bob, where the preparation and measurement of the photons use four non-orthogonal quantum states (e.g., polarization states 0 and 90 degrees, and 45 and −45 degrees). In 1992 Bennet showed that the protocol can also be implemented with only two states. In 1991 A. K. Ekert published a variant protocol (E91) in *Phys. Rev. Lett.*, 67, 661 (1991) which involves entangled quanta (i.e., quantum Bell states) sent from a common source to Alice and Bob. C. H. Bennet, G. Brassard, and N. D. Mermin published a similar protocol (BBM92) in *Phys. Rev. Lett.*, 68, 557 (1992) based on quantum entanglement. There are various implementations of the BBM92 entanglement approach. One uses polarization entanglement, and is described in J. Jennewein et al., *Phys. Rev. Lett.* 84, 4729 (2000). This approach suffers from practical problems due to the fact that the polarization state of light changes in optical fibers due to randomly varying birefringence. Another version of BBM92 uses energy-time (i.e., phase-time) entangled Bell states, and is described in W. Tittle et al., *Phys. Rev. Lett.*, 84, 4737 (2000). Because energy-time entanglement is robust against perturbations of fiber transmission characteristics, this approach has practical advantages over the use of polarization entanglement.

Figure 1:
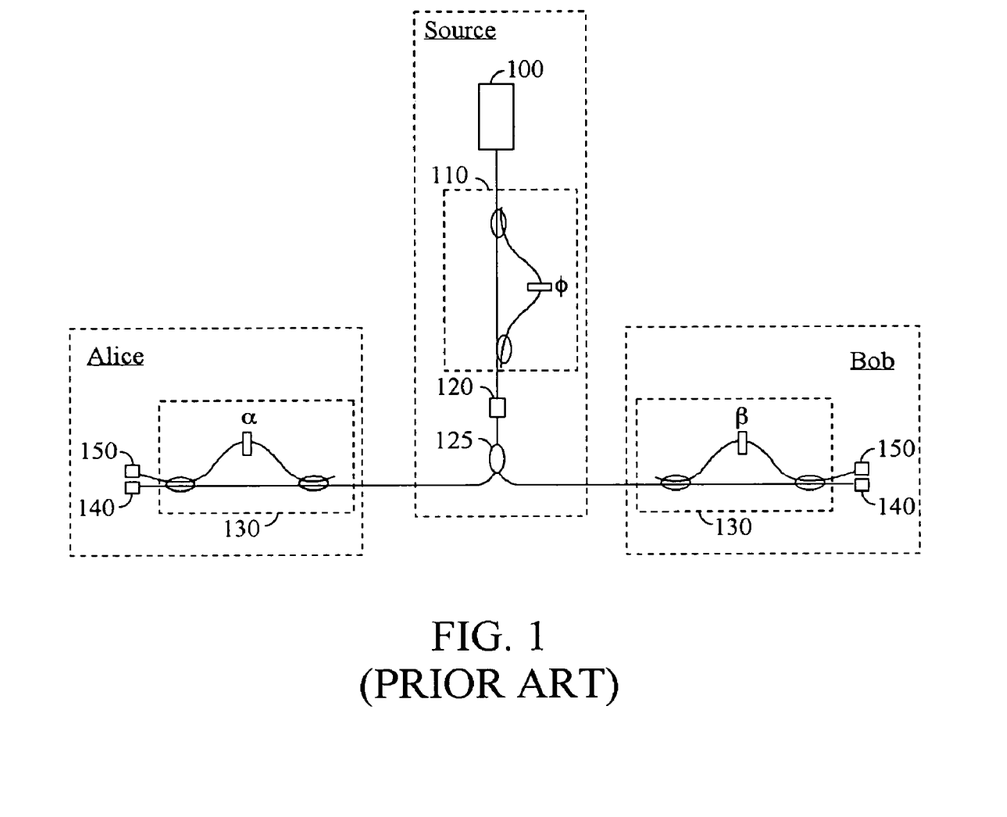
FIG. 1 is a schematic diagram illustrating a quantum key distribution system employing a parametric down-converter in the photon source.

According to Tittle's energy-time entanglement technique, an entangled photon pair is generated using a pulsed laser 100, an optical interferometer 110, and a parametric down-converter 120, as illustrated in FIG. 1. The two arms of the interferometer 110 have different path lengths (specified by a phase difference $\phi$), effectively splitting a single laser pulse into a superposition of two time-separated pulses. A nonlinear crystal is used as the parametric down-converter 120, producing an entangled down-converted photon pair in a maximally-entangled Bell state. The two down-converted photons are directed to a coupler 125 that separates the pairs, one going to Alice and one going to Bob. When an appropriate phase matching condition in parametric down conversion is satisfied, two photons of the entangled pair have different wavelengths. Thus, the photons can always be separated by a wavelength division multiplexing (WDM) coupler 125, and each goes to Alice or Bob, respectively.

At each receiver is an interferometer 130 and two single-photon counters 140, 150 at its two outputs. Thus, each photon is further split at the receiver into a superposition of two time-separated photons. The interferometer arms have unequal path length differences (specified by phases $\alpha$ and $\beta$) which are selected so that the time delays at the receiver interferometers 130 are equal to the time delay at the source interferometer 110. Consequently, each photon will be measured in one of three time slots, depending on whether (1) the photon took short paths through both interferometers (state |S>|S>), (2) a short path and a long path (states |S>|L> or |L>|S>), or (3) two long paths (state |L>|L>). Because the photon pair is generated in a maximally-entangled quantum state, the two receivers will be correlated in either their measurement of which interferometer route the photons took (time) or their measurement of which detectors the photons triggered (phase).

In order to build up the secret key, for each event Alice and Bob publicly disclose limited information about their measurements. In particular, Alice discloses for each event whether or not the photon was detected in the second time slot and Bob discloses the same information about his measurements. In ¼ of the events, both Alice and Bob will disclose that they detected a photon in the second time slot. In this case, they both know that their photons are correlated in phase (the energy base). Consequently, by appropriately assigning their two interferometer detectors bit values 0 and 1, they can obtain correlated bit values. Because only Alice and Bob know which detector their photons arrived at, these bit values are completely private. In another ¼ of the events, both Alice and Bob will disclose that they did not detect a photon in the second time slot. In this case, they know that their photons are correlated in time (the time base). They can thus obtain correlated bit values by assigning the first and third time slots bit values 0 and 1. Because only Alice and Bob know which time slot the photon arrived in, these bit values are completely private. In another ¼ of the events, Alice detects a photon in the second time slot while Bob detects a photon in the first or third time slot. In this cases there is a basis mismatch and no correlated bit can be assigned. Similarly, there is a basis mismatch in another ¼ of the events where Bob detects a photon in the second time slot while Alice detects a photon in the first or third time slot. Thus, only half of the events can be used for key creation.

One disadvantage of this particular approach to QKD is its comparatively low communication efficiency due to the fact that the efficiency of the parametric down-conversion must be kept low. High parametric down-conversion would result in a high probability of generating more than two photon pairs per pulse, and/or a high probability of generating photon pairs in sequential pulses. The system requires these probabilities to be low, so that these undesired events do not happen often.

Another disadvantage of the above approach to QKD is that it requires delicate phase control in the source interferometer. The reason for this requirement is that the phase correlation between the photon pairs generated in the parametric down-conversion process depends on the exact phase difference between the two time-separated photons that come out of the source interferometer. Because the phase correlation between the photon pairs must be stable to provide reliable bit correlations in the case where both Alice and Bob detect photons in the second time slot, the source interferometer must be delicately controlled to preserve the phase difference between its two arms.

It would be an advance in the art of QKD to provide a technique to overcome these and other disadvantages.

SUMMARY OF THE INVENTION

The present invention provides an improved technique for QKD that enjoys the advantages of energy-time entanglement approaches without the disadvantages associated with generating maximally-entangled photon pairs using parametric down-conversion. Surprisingly, the present inventors have discovered that QKD based on energy-time entanglement can be implemented without parametric down-conversion or other sources of maximally-entangled photon pairs. The technique of the invention enjoys a simpler practical realization as well as a higher key creation efficiency.

According to one aspect of the present invention, a method for QKD comprises using a regulated single-photon source to sequentially generate a first photon and a second photon, where the two photons are indistinguishable except for a separation in their generation times by a time interval $\Delta t$. The two photons are directed through a coupler (such as a beam splitter) that directs each photon to one of two transmission lines, which lead to two respective receivers. When it arrives at one of the receivers, the photon passes through an interferometer. One arm of the interferometer has a path length longer than the other arm by an amount equivalent to a photon time delay of $\Delta t$. The photon is then detected by one of two single-photon detectors associated with each of the two interferometer outputs. Each photon is measured in one of three time slots, depending on whether (1) the first photon took the short path through the interferometer, (2) the first photon took the long path or the second photon took the short path, or (3) the second photon took the long path.

In half the cases, the two photons are directed to the same receiver. Because this provides no useful information for QKD, these cases are discarded. In the other half of the cases, one photon goes to each receiver. Both receivers measure which of three sequential time-slots the photon arrives in, and which of the two detectors was triggered by the photon. Each receiver then communicates whether or not it detected a photon in the second time slot.

There will be three cases: (1) Both receivers detect a photon in the second time slot. In other words, the first photon took the long path in one receiver and the second photon took the short path in the other receiver. In this case, because the photons are indistinguishable, the two receivers will be correlated in their measurements of which detectors the photons triggered (phase). Thus, a quantum key bit value is determined by which detector was triggered. (2) Both receivers do not detect a photon in the second time slot. In other words, the first photon took the short path in one receiver and the second photon took the long path in the other receiver. In this case, the receiver measurements are correlated in time. If one receiver detected a photon in the first time slot, it is known that the second receiver detected a photon in the third time slot, and vice versa. Thus, the quantum key bit value is determined by whether the detection in the first time slot took place at one receiver or at the other. (3) One receiver detects a photon in the second time slot, while the other receiver does not. In other words, the first and second photons both took the long paths in their respective receivers, or both took the short paths in their respective receivers. In this third case, there is no correlation and the data is discarded.

According to another aspect of the invention, a QKD system is provided. The system comprises a transmitter, two optical transmission lines, and two receivers. Each receiver comprises an interferometer with a single-photon detector at each of its two outputs. The interferometer has one of its arms longer than the other by an amount sufficient to induce a time delay of $\Delta t$. The transmitter comprises a regulated single-photon source controlled to generate sequential photons separated by a time interval $\Delta t$, and a beam splitter.

DETAILED DESCRIPTION

Embodiments of the invention provide novel energy-time entanglement QKD systems and methods. In contrast with prior energy-time entanglement QKD techniques whose photon source includes a pulsed laser, interferometer, parametric down-converter, and beam-splitter, according to embodiments of the present invention the entangled photons are generated by a regulated single-photon generator and a beam splitter. No parametric down-converter or interferometer is required at the source. The photon pairs are not generated in maximally entangled Bell states, as in the prior art. Surprisingly, the inventors have discovered that these photons can nevertheless be used to provide an QKD technique with a higher key creation efficiency than prior techniques using maximally-entangled photons generated by parametric down-conversion.

In contrast to previous approaches to energy-time entanglement QKD where all the generated photon pairs are separated and sent to different receivers, in a preferred embodiment of the present invention half of the photon pairs are separated and another half of the pairs are not. Of the separated cases, half will have a basis mismatch and half will not, resulting in a sifted key creation efficiency of ¼. Nevertheless, the present approach has an effective key creation rate higher than that of the prior art because the parametric down-converter sources in the prior approaches must be operated at low efficiencies, whereas such a limitation does not apply to the photon source of the present invention.

Figure 2:
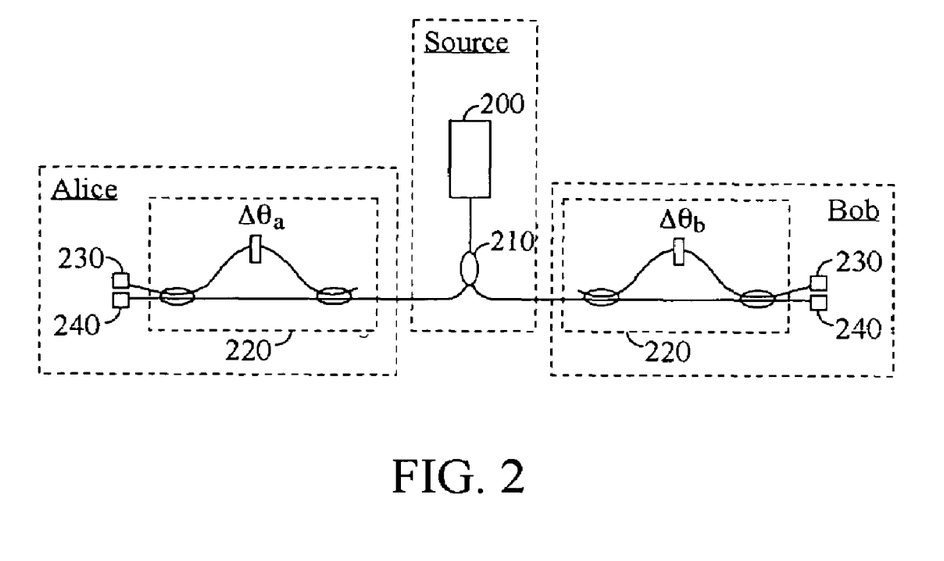
FIG. 2 is a schematic diagram illustrating a quantum key distribution system employing a single-photon generator according to an embodiment of the present invention.
Figure 5:
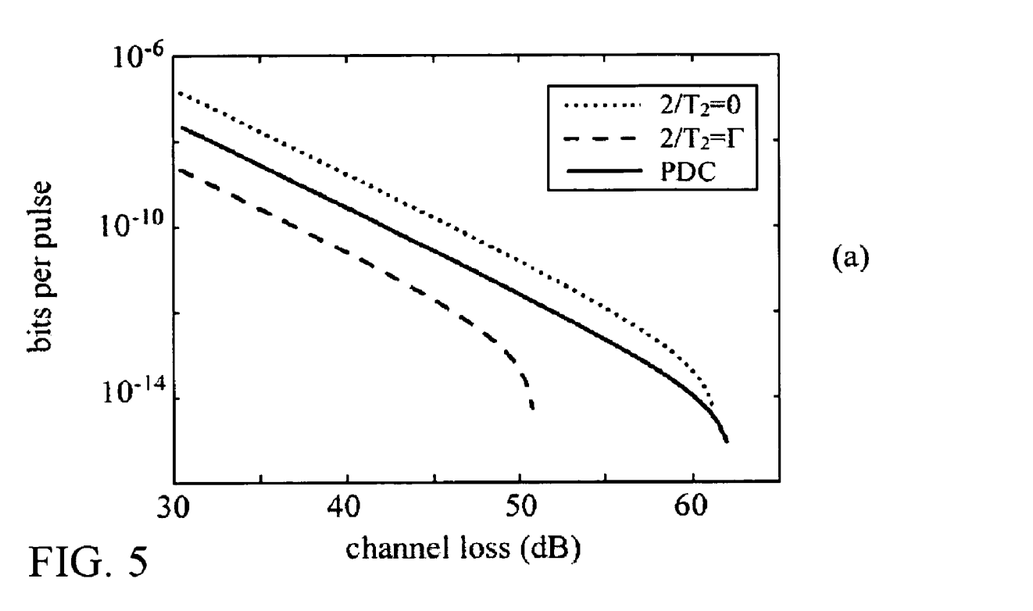
FIG. 5 is a graph of bits per pulse vs. channel loss, comparing an ideal and non-ideal decoherence cases associated with embodiments of the present invention with an ideal case associated with a quantum key distribution system using parametric down-conversion.

A system according to one embodiment of the invention of the proposed QKD system is shown in FIG. 2. A photon source or transmitter comprises a single-photon generator 200 designed to emit two sequential single photons separated by a predetermined time interval $\Delta t$. Although their temporal spacing is regulated, the two sequential photons may be incoherent, i.e., they need not have any specific relative phase relationship. The photon generator efficiency desired depends on the photon generator decoherence. It may be roughly estimated from FIG. 5, which shows bits per pulse in the present system and a prior system using parametric down conversion. For $2/T_2=0$, the present system achieves about 10 times more bits than the previous system at a channel loss of 30 dB, for example. Noting that a single-photon generator of 100% efficiency is assumed in the figure, this simulation indicates that the system performance is equal for the previous system and the present one using a single-photon generator of 10% efficiency. In other words, the desired photon generator efficiency is greater than 10% in case of $2/T_2=0$. On the other hand, the desired decoherence depends on the efficiency. FIG. 5 shows that a single-photon generator of $2/T_2=\Gamma/2$ provides the same system performance as the previous system, roughly speaking, which indicates $2/T_2$ should be smaller than $\Gamma/2$ in case of 100% efficiency.

In many embodiments, it is preferable that the photon generator have a small $g^{(2)}(0)$ value, i.e., less than a certain residual probability that it emits more than two sequential single photons. The desired $g^{(2)}(0)$ can be roughly estimated from FIG. 6, which shows the system performance for various $g^{(2)}(0)$. Compared with the previous system shown in FIG. 5, $g^{(2)}(0)$ of 10% with $2/T_2=0.1\Gamma$ still provides better performance than parametric down-conversion. Though a precise value is not given from the figure, we can say that $g^{(2)}(0)$ of less than 10% is preferable in most embodiments.

The regulated single-photon generator 200 may be implemented, for example, using a quantum dot embedded in a micro-cavity, as described in [13]. Alternatively, the single-photon generator could be implemented using color centers in diamond, as described in [19]. The photon generator may be optically or non-optically triggered at the predetermined interval $\Delta t$ by various possible techniques such as, for example, splitting and recombining a pump pulse with an appropriate time delay.

The source also comprises a simple beam splitter 210, or similar coupler, optically connected to the single-photon generator 200 so that each of the two sequentially generated photons is coherently split into two components, or amplitudes. The two components of this coherent superposition are coupled, respectively, to two respective transmission lines which carry the components to two respective receivers, Alice and Bob. Each photon is thus split into two coherent, spatially separated components. The transmission lines are typically optical fibers. Other devices that do not change the quantum state, e.g., a passive optical switch, can be inserted in the transmission line, if necessary.

The optical fibers are preferably conventional telecom fibers designed for carrying wavelengths in the range 1300 nm to 1550 nm, or special-purpose fibers designed for shorter wavelengths. The transmission lines may also be free-space transmissions. Because channel losses result in a reduction of data capacity, low-loss transmission lines such as telecom fibers are needed for fast key creation rates. In other cases, fast rates are not needed or only lossy channels are available. In many embodiments it is preferable that the source is located roughly between the two receivers. In actual systems, photon counters have dark counts. The signal photon count rate should be higher than the dark count rate in order to distinguish the signal from the noise, for both Alice and Bob. While this requirement is satisfied regardless of the source position in short-distance systems, long-distance systems preferably place the source near the middle of the transmission line in order to satisfy this requirement.

At each receiver, the transmission line is connected to the input of an asymmetric Mach-Zehnder interferometer 220, or equivalent device, designed to coherently split each photon into two component states, introduce a time difference $\Delta t$ between the components, and coherently recombine the time-shifted components. The time difference may be introduced by constructing one arm of the interferometer longer than the other. For $\Delta t$ values of 1 ns or less, the path length difference in glass is 20 cm or less.

The interferometers 220 may be, for example, glass waveguide circuits as described in [20]. Optical paths and couplers may be fabricated on one glass chip by pattern etching using glass waveguide technology. To stabilize the refractive index of the material during operation (so that the path length difference is stable) the interferometers are preferably maintained at a constant temperature by a commercial temperature controller.

Single-photon detectors 230, 240 are placed at each of the two outputs of the interferometer 220 to detect photons originating from generator 200. The detectors may be various types of single-photon counters. All else being equal, the detectors preferably have a high efficiency and small dark count rate. Although 800 nm commercial counters are most highly evolved at present, if the system uses fiber optics at telecom wavelengths around 1550 nm then newer less-evolved detectors at these wavelengths may be used, such as InGaAs/InP avalanche photodiodes. Those skilled in the art can weigh these various trade-offs in light of available components and select appropriate combinations to suit various particular needs and constraints associated with the implementation.

For example, the transmission loss of fiber is 2 dB/km at 800 nm and 0.2 dB/km at 1550 nm. From the viewpoint of the transmission loss, the preferred signal wavelength is 1550 nm. However, 800 nm commercial counters have an efficiency of ~50% and a dark count rate of 100 cps, while InGaAs/InP avalanche photodiodes currently have an efficiency of 10% and a dark count probability of $2.8 \times 10^{-5}$ per gate (2.4 ns). In addition, the InGaAs/InP detectors currently available need to be cooled at −60 C, and need to be operated in the so-called Geiger mode, in which a high bias current pulse is applied just at an instant before a photon is coming. The detector apparatus at 1550 nm currently is more complicated than 800 nm detectors. Thus, for short distance systems, 800 nm wavelength operation may be preferable at present.

Figure 3:
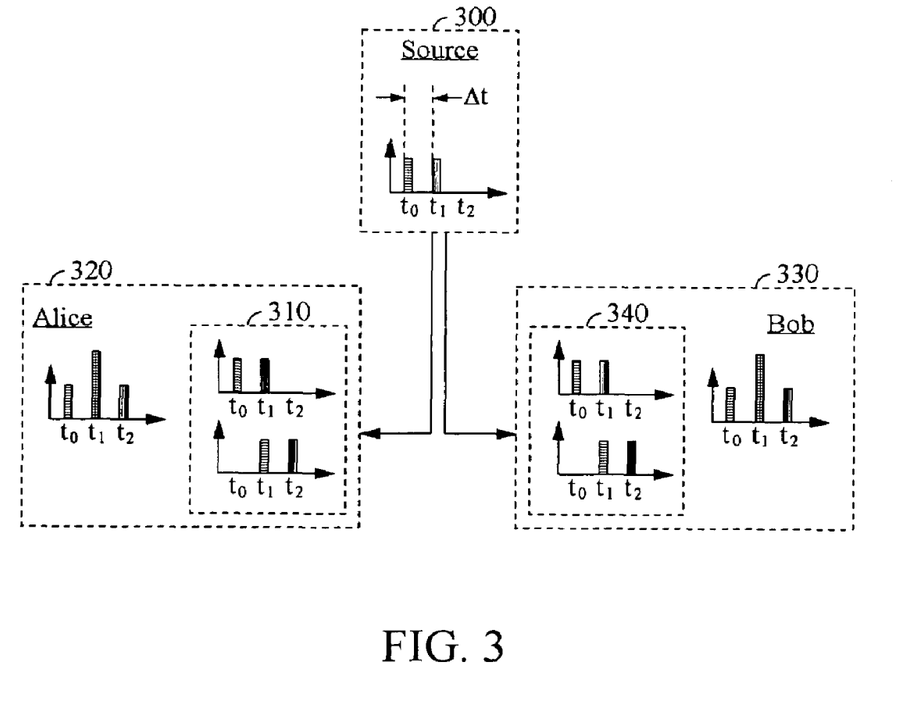
FIG. 3 is a schematic diagram illustrating the operation of the quantum key distribution system of FIG. 2.

In operation, the source 300 periodically generates two sequential photons in time slots $t_0$ and $t_1$, where $\Delta t = |t_1 - t_0|$, as shown in FIG. 3. The time delay $\Delta t$ is sufficiently large that the two photons are distinguishable in time, i.e., larger than the pulse widths of the individual photons generated. It is preferable that $\Delta t$ be small (i.e., 1 ns or less) so that the path length difference of the receiver interferometers is small, since this helps reduce the effects of interferometer instabilities. Each of the two photons is coherently split by a beam splitter into two components which are sent to Alice 320 and Bob 330.

When one of these two components of a photon arrives at Alice 320, her interferometer 310 splits the component into two coherent parts, introduces a relative time delay $\Delta t$ between the parts, and coherently recombines them to generate a coherent superposition of time-shifted states. Similarly, Bob's interferometer 340 generates a coherent superposition of shifted states for the component of the photon arriving there. The time delay $\Delta t$ introduced at interferometers 310 and 340 is selected to be sufficiently close to the time delay $\Delta t$ between the generated pulses at the source 300 so that the delayed first photon and the un-delayed second photon both arrive at the detectors at the same time, i.e., close enough in time so that they are quantum-mechanically indistinguishable in a large percentage of cases. In practice, there will be some jitter in the single-photon source, and this is preferably small in comparison to the photon pulse widths. In addition, the two photons transmitted from the source 300 are also generated with wavelengths sufficiently close that they are indistinguishable, i.e., the beat frequency difference $\Delta f$ between the photons is small enough that the period corresponding to $\Delta f$ is large compared to the pulse width.

In order to ensure indistinguishability of the sequential photons, it is also preferable that they cannot be distinguished by their polarization states. The interferometers should therefore have polarization-independent operation. If the interferometer arms have asymmetric polarization dependence, then techniques should be employed to compensate for this asymmetry. For example, if the glass waveguides are slightly birefringent, a phase rotator can be used to compensate, as described in [21].

Because the generation delay between the first and second photons at the source is substantially equal to the delay introduced in the receiver interferometers, the photons are detected at the receivers in one of three predetermined time slots: $t_0$, $t_1$, and $t_2$, where $\Delta t = |t_2 - t_1| = |t_1 - t_0|$. The source and two receivers, Alice and Bob, are synchronized to a common time-reference so that these time slots are experimentally well-defined and coordinated. This synchronization can be accomplished using optical signals from the source, or from some other common time reference. For example, the source may transmit a synchronization pulse over the same transmission lines to Alice and Bob. The synchronization pulse may be transmitted at a wavelength different from the wavelength of the QKD photons using wavelength division multiplexing (WDM) techniques. At the receivers, optical filters can be used to recover the synchronization pulses. The synchronization pulses are then used to establish a common timing reference for the three QKD photon time slots.

The quantum-mechanical description of a sequential two-photon event is as follows. The single photon generator 200 outputs a first and second photon, resulting in a simple product state $|\psi\rangle_f \otimes |\psi\rangle_s$, which then enters the beam splitter 210. Each photon $|\psi\rangle$ is split by the beam splitter into two components, $|a\rangle$ and $|b\rangle$, resulting in a single product state:

$$|\psi_{in}\rangle = 1/\sqrt{2}(|a\rangle + |b\rangle)_f \otimes 1/\sqrt{2}(|a\rangle + |b\rangle)_s \quad (1)$$
$$= 1/2\{|a\rangle_f \otimes |a\rangle_s + |b\rangle_f \otimes |b\rangle_s$$
$$+ |a\rangle_f \otimes |b\rangle_s + |b\rangle_f \otimes |a\rangle_s\},$$

where subscripts f and s denote photons emitted at the first and second time slots, and $|a\rangle$ and $|b\rangle$ are the states on route to Alice and Bob, respectively. The two terms, $|a\rangle_f \otimes |a\rangle_s$ and $|b\rangle_f \otimes |b\rangle_s$, represent states for which the two sequential photons go the same way. These terms are not of interest since they provide no useful information for the creation of the key. Of significance are the two terms, $|a\rangle_f \otimes |b\rangle_s$ and $|b\rangle_f \otimes |a\rangle_s$, which represent state of which the two photons go opposite ways. When this state interacts with the two interferometers at the receivers, the components are further split into four superposed alternatives. Thus, the total state can be written as five terms: (i) both first and second photons go to the same receiver, (ii) both first and second photons take short arms of the interferometers, (iii) both first and second photons take long arms, (iv) the first takes a short arm and the second a long arm, and (v) the first takes a long arm and the second a short arm. The state after the output beam splitter of the receiver interferometer can be written as $$|\psi_{out}\rangle = 1/2\{|\psi_{aa}\rangle + |\psi_{bb}\rangle\} + \quad (2)(i)$$

$$1/4 e^{i(\phi_a + \phi_b + \theta_{aS} + \theta_{bS})} \quad (2)(ii)$$
$$\{|a_{12}^{(S)}, t_1\rangle \otimes |b_{12}^{(S)}, t_2\rangle + |a_{12}^{(S)}, t_2\rangle \otimes |b_{12}^{(S)}, t_1\rangle\} -$$

$$1/4 e^{i(\phi_a + \phi_b + \theta_{aL} + \theta_{bL})} \quad (2)(iii)$$
$$\{|a_{12}^{(L)}, t_2\rangle \otimes |b_{12}^{(L)}, t_3\rangle + |a_{12}^{(L)}, t_3\rangle \otimes |b_{12}^{(L)}, t_2\rangle\} +$$

$$i/4 e^{i(\phi_a + \phi_b + \theta_{aS} + \theta_{bS})} \quad (2)(iv)$$
$$\{e^{i\Delta\theta_b}|a_{12}^{(S)}, t_1\rangle \otimes |b_{12}^{(L)}, t_3\rangle + e^{i\Delta\theta_a}|a_{12}^{(L)}, t_3\rangle \otimes |b_{12}^{(S)}, t_1\rangle\} + -$$

$$i/8 e^{i(\phi_a + \phi_b + \theta_{aS} + \theta_{bS})} \quad (2)(v)$$
$$\{i(e^{i\Delta\theta_a} + e^{i\Delta\theta_b})(|a_1, t_2\rangle \otimes |b_1, t_2\rangle - |a_2, t_2\rangle \otimes |b_2, t_2\rangle) -$$
$$(e^{i\Delta\theta_a} - e^{i\Delta\theta_b})(|a_1, t_2\rangle \otimes |b_2,$$
$$t_2\rangle - |a_2, t_2\rangle \otimes |b_1, t_2\rangle)\}.$$

Because the phase factor $e^{i(\phi_a+\phi_b)}$ is present in every term, the phases in the transmission lines do not affect measurement results.

The ket $|\psi_{aa}\rangle$ represents the case when both photons reach Alice, and $|\psi_{bb}\rangle$ represents the case when both reach Bob. Since these are discarded, they are not written out in detail. The ket $|a_{1,2}, t_i\rangle$ (resp. $|b_{1,2}, t_i\rangle$) represents the case when a photon reaches Alice (resp. Bob) at either detectors 1 or 2 at time $t_i$. The ket $|a_j, t_i\rangle$ (resp. $|b_j, t_i\rangle$) represents the case when a photon reaches Alice (resp. Bob) at detector j at $t_i$. Superscripts (L) and (S) indicate states where a photon passes through the long and short paths in a receiver interferometer, respectively. The phases $\phi_a$ and $\phi_b$ are the total phases accumulated in the transmission lines from the transmitter to Alice's receiver and to Bob's receiver, respectively. The phases $\theta_{aS}$ and $\theta_{bS}$ are the phase delays in the short paths in the receiver interferometers in Alice's and Bob's sites, respectively. Similarly, the phases $\theta_{aL}$ and $\theta_{bL}$ are the phase delays in the long paths in the receiver interferometers in Alice's and Bob's sites, respectively. The phases $\Delta\theta_a=\theta_{aL}-\theta_{aS}$ and $\Delta\theta_b=\theta_{bL}-\theta_{bS}$ are the phase differences between the long and short paths in Alice's and Bob's interferometers, respectively.

It is also assumed in the above equation that the single-photon generator emits identical photons, so that two photons are indistinguishable whenever they arrive at the same receiver at the same time. Note that no particular condition is required for the phase relationship between the photons at the source. The fact that the phases except for $\Delta\theta_a$ and $\Delta\theta_b$ are outside the superimposed terms indicates that we need not care about these phases when considering the probabilities of the corresponding cases. Provided that the phase difference between the long and short paths in the interferometer is identical for Alice and Bob, i.e., $\Delta\theta_a=\Delta\theta_b=\Delta\theta$, the last superimposed term (2)(v) becomes $$-\tfrac{1}{4}e^{i(\phi_a+\phi_b+\theta_{aS}+\theta_{bS}+\Delta\theta)}\{|a_1, t_2\rangle\otimes|b_1, t_2\rangle+|a_2, t_2\rangle\otimes|b_2, t_2\rangle\}. \quad (3)$$

Again, the output state, Eq. (2), consists of several superposed substates: (2)(i) either Alice or Bob counts two photons, (2)(ii) one party counts a photon at $t_1$ and the other does so at $t_2$, (2)(iii) one party counts a photon at $t_2$ and the other does so at $t_3$, (2)(iv) one party counts a photon at $t_1$ and the other does so at $t_3$, and (2)(v) each party counts a photon at $t_2$.

It is noted in the case represented by term (2)(iv) that detector clicks in time slots $t_1$ and $t_3$ are anti-correlated between Alice and Bob. For example, if Alice detects a photon at $t_1$, this means that it must have been the first photon sent from the transmitter. Consequently, it is then known by Alice that Bob detected the second photon. The substate (2)(iv) is post-selected if Bob indicates that he detected a photon in either time slot $t_1$ or $t_3$ (without specifying which one). In that case, Alice knows he detected the photon in slot $t_3$, indicating that time entanglement is realized if case (iv) is post-selected after the measurement.

Next consider case (v), where photons at Alice and Bob both arrive in time slot $t_2$. In this case photon counts by detectors 1 and 2 are correlated between Alice and Bob. When both parties count a photon at $t_2$, it is not known whether that photon was the first or second photon sent by the source. Thus, the detection event occurs depending on interference between the probability amplitudes for the two. Since the phase difference of these two amplitudes is unknown before measurement, which detector counts a photon is uncertain. However, if the two parties know by post-selection that both photons were received in the same time slot, then once one party counts a photon at a given detector, this implies that the substate is measured in a phase difference of $-\Delta\theta$ or $-\Delta\theta+\pi$, and the other party always detects the photon in a corresponding detector. This consideration indicates that phase entanglement is realized if case (v) is post-selected, i.e., if the parties disclose that they both detected photons in time slot $t_2$ (without disclosing which detector clicked).

The above time-phase entanglement is different from prior art techniques in that a single-photon generator, a beam splitter, and post selection are used in the present scheme instead of a maximally-entangled photon source using parametric down-conversion or similar process to create an entangled photon pair.

Utilizing this entanglement made by the post-selection, a secret key can be created as follows. After detecting a photon, Alice and Bob disclose through a public channel whether (1) a photon was counted at $t_1$ or $t_3$, or (2) a photon was counted at $t_2$. For cases in which Alice and Bob both counted a photon at $t_1$ or $t_3$, they know in which time slot a photon was counted at the other site due to the time entanglement. For cases in which they both counted a photon at $t_2$, they know which detector clicked at the other site due to the phase entanglement. In these two cases, they can jointly determine a bit of a secret key. For other cases, they discard the data. This process is repeated as many times as needed in order to obtain a sifted key of desired length.

If an eavesdropper attempts to measure the photons, to the extent that the measurement interaction provides Eve with information, it will destroy the correlations between the photons. To ensure that this has not happened, Alice and Bob exchange randomly selected test bits and check that these bits match in a high percentage of cases, where the percentage threshold is determined by an estimated noise level of the channel. If the bit differences exceed the channel noise level, Alice and Bob may conclude that someone has eavesdropped on their communication. In that case, they discard the entire key. If the bit differences are below the noise level of the channel, Alice and Bob discard just the test bits, and retain the remaining bits. Alternatively, Eve may attempt an intercept/resend attack. In this case, Eve measures the original photons and resends another new pair of photons in their place. Because Eve cannot clone the original photons and send a perfect copy of the original quantum state on to Alice and Bob, the new pair of photons sent by Eve will not exhibit the post-selection correlations of the original state. Thus, the intercept/resend attack introduces bit errors into the secret key, which will be revealed to Alice and Bob when they check test bits, as in the previous case.

Once Alice and Bob obtain the sifted key bits as described above, they may then use standard techniques of error correction and privacy amplification to generate a final key. For example, error correction can be implemented using the CASCADE algorithm described in G. Brassard and L. Salvail, in *Advances in Cryptography-EUROCRYPT '93*, vol. 765 of *Lecture Notes in Computer Science*, edited by T. Hellseth (Springer, Berlin, 1994), pp. 410-423. Privacy amplification may be implemented using random hash functions as described in M. N. Wegman and J. L. Carter, *J. Comput. System Sci.*, 22, 265 (1981).

In BBM92 implementations, which use a combination of an interferometer and a parametric down-converter in the transmitter, precise phase control for the transmitter interferometer is required for high correlation in the case where the photons arrive at the same times, while such control is not necessary for the transmitter in the present system. The reason for this difference can be intuitively understood as follows. The correlations between the detector measurements at the receivers depends on the phase difference between the two sequential photon amplitudes at the receivers. In the BBM92 scheme, the amplitudes of the entangled photons generated by parametric down-conversion have a specific phase relationship determined by the parametric process: $\theta_s + \theta_i = \theta_p + \pi/2$, where $\theta_s$ and $\theta_i$ are the phases for the two photons (called signal and idler photons), respectively, and $\theta_p$ is the phase of the pump light. From this relationship, one obtains $(\theta_{s1} - \theta_{s2}) + (\theta_{i1} - \theta_{i2}) = (\theta_{p1} - \theta_{p2})$, where subscripts 1 and 2 denote first and second time-slots, respectively. This indicates that the correlation between $(\theta_{s1} - \theta_{s2})$ and $(\theta_{i1} - \theta_{i2})$ depends on $(\theta_{p1} - \theta_{p2})$. Thus, the phase of the pump phase difference has to be precisely controlled in order to obtain a fixed correlation between $(\theta_{s1} - \theta_{s2})$ and $(\theta_{i1} - \theta_{i2})$.

In the present scheme, on the other hand, this precise phase control is not necessary. Despite the fact that the relative phase between the first and second photons is random for each generated pair (i.e., the photons in each pair are incoherent), because each sequential photon in the pair is coherently split by a beam splitter the phase difference between the superposed sequential amplitudes going to Alice and the superposed sequential amplitudes going to Bob is automatically zero. For example, suppose that a first and a second photon states are expressed as $|1\rangle$ and $e^{i\theta}|2\rangle$, where $\theta$ is the relative phase between the first and second photons. The value of $\theta$ is random for each photon pair. When the first photon state $|1\rangle$ passes through the beam splitter, it splits into a superposition of two amplitudes, $(|a1\rangle + |b1\rangle)/\sqrt{2}$, where one amplitude is going to Alice and the other amplitude to Bob. Similarly, the second photon state $e^{i\theta}|2\rangle$ splits into $e^{i\theta}(|a1\rangle + |b1\rangle)/\sqrt{2}$. Thus, the superposition of the sequential amplitudes going to Alice is written as $(|a1\rangle + e^{i\theta}|a2\rangle)/\sqrt{2}$ and the superposition of the sequential amplitudes going to Bob is $(|b1\rangle + e^{i\theta}|b2\rangle)/\sqrt{2}$. This shows that the relative phase between the first and second amplitudes is identical in the states on the route to Alice and to Bob, even though the value $\theta$ itself is random for each photon pair. Because of this automatic equality of relative phases, there is no need for phase stabilization at the transmitter. Phase stabilization is only an issue for the two receiver interferometers. The system is consequently simpler in both design and operation than prior systems.

Because the present QKD scheme does not use maximally-entangled Bell states, a key is created only in ¼ of the cases, i.e., when substates (iv) and (v) occur. The probability of observing each of these substates is ⅛. Thus, the efficiency of creating a sifted key is ¼. In BBM92 using an ideal twin photon generator, the efficiency is ½ because the states are maximally entangled and fewer substates are discarded. The efficiency in the present scheme is one-half of the ideal efficiency of BBM92 because the state is not maximally entangled and so the post selection procedure makes use of fewer substates. Surprisingly, however, the present scheme actually results in a higher key creation efficiency in practice than the BBM92 technique. The reason for this result derives from practical considerations which will now be explained.

The reason why the present scheme results in a higher key creation efficiency than actual BBM92 is as follows. In practice, the prior implementations of BBM92 have used a parametric down-converter for generating an entangled photon pair. Suppose that the efficiency that one photon pair is generated by one pump pulse is $\eta$. For this efficiency, the probability that one photon pair is generated from either one of two sequential pump pulses is $\eta(1-\eta) + (1-\eta)\eta = 2\eta(1-\eta)$, the probability that a photon pair is generated from each of two sequential pump pulses is $\eta^2$, and the probability that two photon pairs is generated from one of two sequential pump pulses is $\eta^2(1-\eta) + (1-\eta)\eta^2 = 2\eta^2(1-\eta)$. For the system to operate, the latter two cases have to be negligible in comparison to the first case. Thus, $2\eta(1-\eta) \gg \eta^2 + 2\eta^2(1-\eta)$, i.e., $1 \gg \eta(2-\eta)$. Because $0 < \eta < 1$, this inequality is satisfied when $1 \gg 2\eta$. This consideration indicates that in prior systems the generation efficiency of entangled photons needs to be small, which means that one entangled photon pair is transmitted, for example, every 10 pump cycles or less. In the present system, on the other hand, a single-photon source is utilized, which has no probability of emitting two photons by one trigger. Thus, a photon pair is transmitted every clock cycle. As a result, the present system provides a higher key creation rate per clock cycle.

A critical issue for practical implementation of the proposed system is the interference visibility between two photons emitted sequentially. Perfect two-photon interference, the fifth term in Eq. (2), occurs only if the two photons are identical, i.e., Fourier-transform-limited. A real single-photon source will likely suffer from dephasing, and the interference visibility will be thus degraded, leading to bit errors. The visibility V is given by $$V = \langle |\int d\omega A(\omega) B^*(\omega)|^2 \rangle, \qquad (4)$$

where $A(\omega)$ and $B(\omega)$ are the normalized spectral amplitudes for two photons, and $\langle \cdot \rangle$ denotes an ensemble average over all possible photons. Here, we assume a single-photon source based on spontaneous emission between particular two levels [8-14], and a model in which the amplitude of an emitted photon decays exponentially with a Fermi's golden rule decay rate, while the phase is randomly modulated. The amplitude of such a photon is written as $$A(t \geq 0) = \Gamma^{1/2} e^{-(\Gamma/2)t - i\omega_0 t - i\phi(t)}, \qquad (5)$$

where $\Gamma$ is the spontaneous emission decay rate, $\omega_0$, is the optical center frequency, and $\phi(t)$ is a random phase. The phase fluctuations are characterized by the two-time correlation function, $$\langle e^{i\phi(t)} e^{i\phi(t+\tau)} \rangle = e^{-\tau/T_2}. \qquad (6)$$

The random-walk phase diffusion process in the Born-Markoff approximation is assumed here, and $T_2$ is a decoherence time. Under the assumption that the two photons are described by an identical two-time correlation function, the interference visibility can be derived from the above model to be $$V = \Gamma/(\Gamma + 2/T_2). \qquad (7)$$

Figure 4:
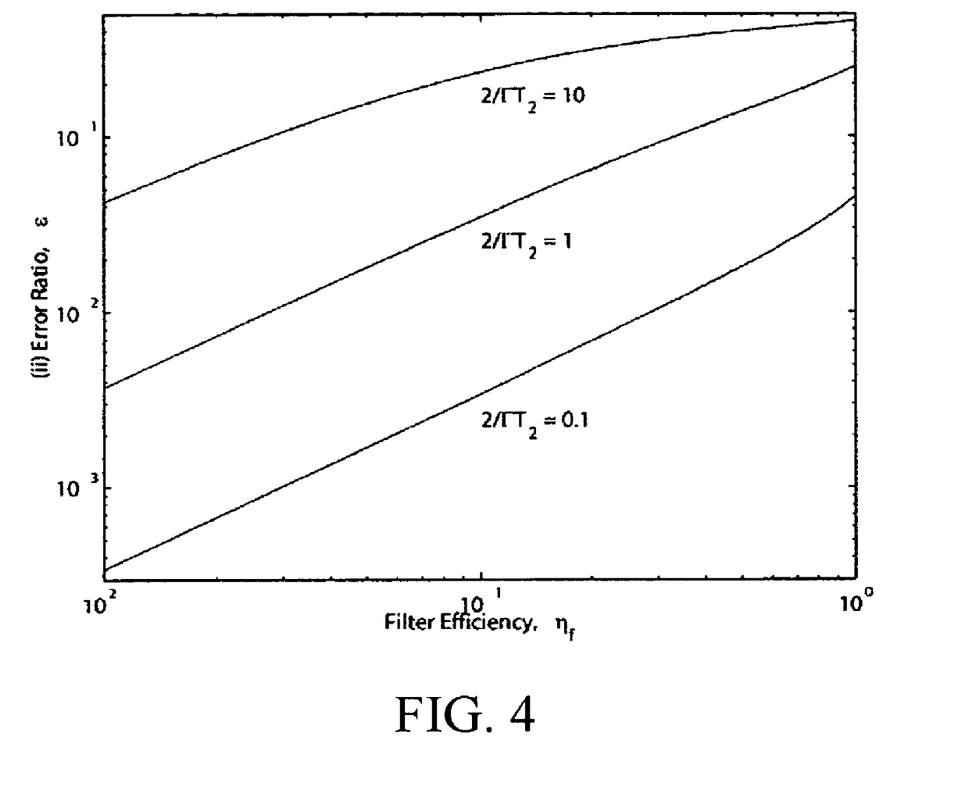
FIG. 4 is a graph of error rate vs. filter efficiency for the three degrees of decoherence, associated with embodiments of the present invention.

A perfect visibility is achieved when the phase decoherence rate is much slower than the spontaneous emission decay rate. For a non-negligible decoherence rate, however, the visibility becomes less than one and bit errors may occur. To overcome this problem, we can use an optical bandpass filter that creates a Fourier-transform-limited photon at the expense of photon generation efficiency. Assuming a Lorentzian filter with full-width-at-half-maximum $\Sigma$, one can show that the visibility after filtering is given by $$1 - V = ((2/T_2)/(2/T_2 + \Gamma))(\Sigma/(\Sigma + \Gamma))((2/T_2 + \Sigma + 2\Gamma)/(2/T_2 + \Sigma + 3\Gamma)), \qquad (8)$$

with the filtering efficiency of $\eta_f = \Sigma/(2/T_2 + \Sigma + \Gamma)$. Based on the above discussion, the error rate due to the imperfect visibility, i.e., $\epsilon = (1-V)/2$, is evaluated as a function of the filtering efficiency $\eta_f$ as shown in FIG. 4. Three cases are illustrated: weak decoherence (i.e., $2/T_2 \approx 0.1\Gamma$), moderate decohorence (i.e., $2/T_2 \approx \Gamma$) and strong decoherence (i.e., $2/T_2 \approx 10\Gamma$). The graph shows how the phase-decoherence affects the error rate and the efficiency.

Figure 6:
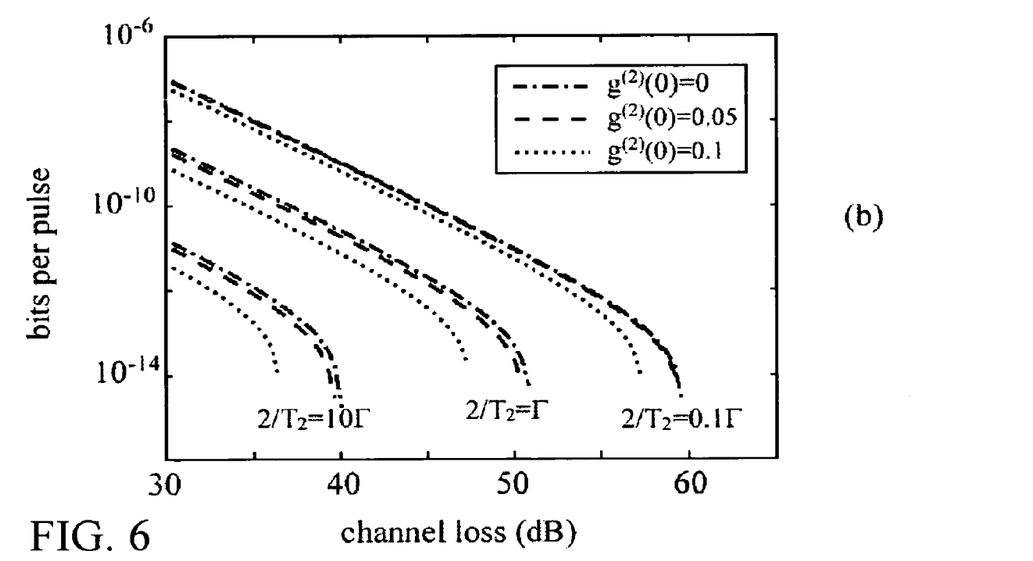
FIG. 6 is a graph of bits per pulse vs. channel loss, illustrating the effect of different degrees of decoherence and different values of $g^{(2)}(0)$ according to an embodiment of the present invention.

Next, we evaluate the overall system performances of the present scheme as compared to the conventional BBM92 scheme using a parametric down-converter. Using the method described in Ref. [18], a final secret key creation rate normalized by a clock rate is calculated through the complete analysis of raw quantum transmission, error correction, and privacy amplification processes. The results for the present scheme using an ideal single-photon source and BBM92 using a parametric down-converter are shown in FIG. 5. For comparison, the simulation result for BB82 using a single-photon source is also plotted as PDC. In the conventional BBM92, there is a trade-off between the error rate and the generation efficiency of entangled photons. A higher efficiency causes a higher error rate due to the unwanted generation of more than two photon-pairs per pulse or due to the unwanted generation of two sequential photon-pairs. In the calculation here, the photon pair generation efficiency is optimized for each transmission loss. The figure shows that the present scheme realizes a higher key creation efficiency in the ideal case where $2/T_2=0$. Non-ideal cases are evaluated in FIG. 6, where various decoherence rates $1/T_2$ and various $g^{(2)}(0)$, which represents residual probability of more than two photons per pulse, are assumed. In the calculations, an optical filter with an optimized bandwidth is assumed based on the previous discussion. FIG. 6 indicates that the decoherence rate and $g^{(2)}(0)$ are important for optimal system performance.

REFERENCES

[1] C. H. Bennett and G. Brassard, in Proc. of IEEE Int. Conf. on Computers, Systems, and Signal Processing, Bangalore, India (IEEE, New York, 1984), p. 175.

*[2] A. K. Ekert, Phys. Rev. Lett., 67, 661 (1991).

*[3] C. H. Bennett, G. Brassard, N. D. Mermin, Phys. Rev. Lett., 68, 557 (1992).

*[4] C. H. Bennett, Phys. Rev. Lett., 68, 3121 (1992).

[5] B. Huttner, N. Imoto, N. Gisin, and T. Mor, Phys. Rev. A, 51, 1863 (1995).

*[6] T. Jennewein, C. Simon, G. Weihs, H. Weinfurter, and A. Zeilinger, Phys. Rev. Lett, 84, 4729 (2000).

*[7] W. Tittle, J. Brendel, H. Zbinden, and N. Gisin, Phys. Rev. Lett., 84, 4737 (2000).

[8] F. De Martini, G. Di Giuseppe, and M. Marrocco, Phys. Rev. Lett., 76, 900 (1996).

[9] C. Brunel, B. Lounis, P. Tamarat, and M. Orrit, Phys. Rev. Lett., 83, 2722 (1999).

[10] B Lounis and W. E. Moerner, Nature, 407, 491 (2000).

[11] P. Michler et al., Sience, 290, 2282 (2000).

[12] V. Zwiller et al., Appl. Phys. Lett., 78, 2476 (2001).

[13] C. Santori, M. Pelton, G. Solomon, Y. Dale, and Y. Yamamoto, Phys. Rev. Lett., 86, 1502 (2001).

[14] Z. Yuan et al., Science, 295, 102 (2002).

*[15] Z. Y. Ou and L. Mandel, Phys. Rev. Lett., 61, 50 (1988).

*[16] Y. H. Shih and C. O. Alley, Phys. Rev. Lett., 61, 2921 (1988).

[17] J. D. Franson, Phys. Rev. Lett., 62, 2205 (1989).

*[18] E. Waks, A. Zeevi, and Y. Yamamoto, quant-ph/0012078 (2000)

*[19] R. Rouri et al., Opt. Lett., vol. 25, p. 1294 (2000).

*[20] F. Bobfrate et al., Electron. Lett., vol. 37, p. 846 (2001).

*[21] Y. Inoue et al., J. Lightwave Technol. vol. 15, p. 1947 (1997).

The invention claimed is:

1. A method for time-phase entanglement quantum key distribution comprising:
    a) at a photon transmitter, generating with a regulated single-photon generator a pair of photons separated in time by a predetermined delay $\Delta t$; and coherently splitting each of the photons into two components of a coherent superposition;
    b) transmitting the two components of each photon, respectively, to two receivers;
    c) at the two receivers, generating from each component of each photon a coherent superposition of time-shifted states having a relative time shift of $\Delta t$; detecting the photons with single-photon detectors; and deriving part of a quantum key from detector information and time slot information associated with the detecting, wherein the quantum key is jointly determined by the two receivers.

2. The method of claim 1 wherein the photons of the pair are generated with random relative phase.

3. The method of claim 1 wherein the photons are quantum-mechanically indistinguishable by the detectors.

4. The method of claim 1 wherein the receivers have polarization-independent operation.

5. The method of claim 1 wherein a period corresponding to a beat frequency difference $\Delta f$ between the photons is larger than a pulse width of the photons.

6. The method of claim 1 wherein $\Delta t$ is larger than a pulse width of the first photon and larger than a pulse width of the second photon.

7. The method of claim 1 wherein $\Delta t$ is 1 nanosecond or less.

8. The method of claim 1 further comprising synchronizing the transmitter and two receivers to a common time-reference.

9. A time-phase entanglement quantum key distribution system comprising:
    a) a photon pair source comprising a regulated single-photon generator for sequentially generating two photons of a pair, wherein the two photons are generated with random relative phase and are separated by a predetermined time interval $\Delta t$, and an optical coupler for coherently splitting each of the two photons into two coherent components of a coherent superposition;
    b) two optical transmission lines coupled to the photon pair source for transmitting, respectively, the two coherent components of each of the two coherently split photons; and
    c) two receivers coupled, respectively, to the two optical transmission lines, wherein each of the receivers comprises and interferometer having two arms with relative optical path difference substantially equal to the time interval $\Delta t$, and a pair of single-photon detectors coupled to each interferometer.

10. The system of claim 9 wherein the regulated single-photon generator comprises a quantum dot embedded in a micro-cavity.

11. The system of claim 9 wherein the regulated single-photon generator is implemented using color centers in diamond.

12. The system of claim 9 wherein the regulated single-photon generator comprises a time synchronization pulse transmitter.

13. The system of claim 9 wherein the interferometer comprises a glass waveguide circuit.

14. The system of claim 9 wherein the interferometer comprises a phase rotator.

15. The system of claim 9 wherein the detectors comprise InGaAs/InP avalanche photodiodes.

* * * * *